United States Patent
Lewitt (10) Patent No.: US 8,732,145 B1
(45) Date of Patent: May 20, 2014

(54) VIRTUAL ENVIRONMENT FOR DATA-DESCRIBED APPLICATIONS

(75) Inventor: Miles M. Lewitt, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 495 days.

(21) Appl. No.: 12/507,340

(22) Filed: Jul. 22, 2009

(51) Int. Cl.
*G06F 17/30* (2006.01)
*G06F 7/00* (2006.01)

(52) U.S. Cl.
USPC ............. 707/705; 707/758; 707/760; 706/45; 706/46

(58) Field of Classification Search
None
See application file for complete search history.

(56) References Cited

U.S. PATENT DOCUMENTS

| | | | |
|---|---|---|---|
| 7,552,393 B2 * | 6/2009 | Hayes-Roth | 715/753 |
| 2005/0038690 A1 * | 2/2005 | Hayes-Roth | 705/9 |
| 2005/0154742 A1 * | 7/2005 | Roth et al. | 707/100 |
| 2005/0240558 A1 * | 10/2005 | Gil et al. | 707/1 |
| 2005/0246686 A1 * | 11/2005 | Seshadri et al. | 717/117 |
| 2006/0020586 A1 * | 1/2006 | Prompt et al. | 707/3 |
| 2006/0136720 A1 * | 6/2006 | Armstrong et al. | 713/164 |
| 2006/0155912 A1 * | 7/2006 | Singh et al. | 711/6 |
| 2006/0259629 A1 * | 11/2006 | Usmani et al. | 709/227 |
| 2006/0278694 A1 * | 12/2006 | Jha et al. | 235/379 |
| 2007/0016614 A1 * | 1/2007 | Novy | 707/104.1 |
| 2007/0088852 A1 * | 4/2007 | Levkovitz | 709/246 |
| 2007/0143398 A1 * | 6/2007 | Graham | 709/204 |
| 2007/0147323 A1 * | 6/2007 | Matsui et al. | 370/338 |
| 2007/0150806 A1 * | 6/2007 | Hartmann | 715/523 |
| 2007/0288535 A1 * | 12/2007 | Shitomi et al. | 707/204 |
| 2009/0036111 A1 * | 2/2009 | Danford et al. | 455/419 |
| 2009/0180394 A1 * | 7/2009 | Tanaka et al. | 370/252 |
| 2009/0319672 A1 * | 12/2009 | Reisman | 709/227 |

* cited by examiner

*Primary Examiner* — Angelica Ruiz
(74) *Attorney, Agent, or Firm* — Park, Vaughan, Fleming & Dowler LLP; Steven E. Stupp (57) ABSTRACT

Embodiments of a computer system, a method, and a computer-program product (e.g., software) for use with the computer system are described. These embodiments may be used to generate an application description of one or more data-described applications that provides one or more functions in a virtual environment on a portable electronic communication device, such as a cellular telephone. This application description may be based at least in part on a schema that defines one or more fields, one or more formats and/or one or more sequences of data. Using the application description, a given data-described application may interpret data in the virtual environment. Moreover, by compiling the schema with the appropriate data to describe an application, the application running on a virtual environment can support multiple models and configurations of the portable electronic communication device.

23 Claims, 4 Drawing Sheets

VIRTUAL ENVIRONMENT FOR DATA-DESCRIBED APPLICATIONS

BACKGROUND

The present invention relates to a technique for generating an application description for a set of data-described applications that execute in a virtual environment on a portable electronic device.

An increasing number of software applications are being developed for portable electronic devices, such as cellular telephones. However, at any given time, there are a wide variety of portable electronic devices, including numerous models that are provided by multiple manufacturers. These models often have different hardware and software configurations. Attempting to support all of these configurations is complicated, time-consuming and expensive for software developers. Consequently, many software applications can only be used on a small subset of the available portable electronic devices, which is frustrating for the manufacturers, users, and network operators. Furthermore, in order to support even a small subset of the portable electronic devices, rigid constraints are typically imposed on the software applications, which significantly constrains innovation.

SUMMARY

One embodiment of the present invention relates to a computer system that generates an application description for a set of data-described applications that is configured to execute in a virtual environment in one or more operating systems on one or more portable electronic communication devices. During operation, the computer system receives a schema corresponding to a set of data-described applications, such as financial applications. For a given set of data-described applications, the schema defines one or more fields, one or more formats and/or one or more sequences of data that are interpreted by the given application in the virtual environment to provide one or more functions associated with the given data-described application. The specific application is generated by populating the fields in the schema with the appropriate values.

In some embodiments, the one or more portable electronic communication devices include: a cellular telephone, a portable computer, and/or a personal digital assistant.

Moreover, the schema may be specified using a data language. The set of data-described applications from a given scheme is limited by the scope of the schema.

Note that a given operating system may correspond to a given model of the one or more portable electronic communication devices, which may include multiple models of the one or more portable electronic communication devices that are provided by multiple manufacturers. For example, the one or more operating systems may include: multiple operating systems and/or different hardware configurations of the multiple models of the one or more portable electronic communication devices. These different hardware configurations may include: different processors, different amounts of memory, and/or different peripherals provided by multiple peripheral manufacturers. Moreover, the virtual environment may be compiled to execute in the given operating system on the given model of the one or more portable electronic communication devices.

In some embodiments, the application description is given to a given manufacturer of the given model of the one or more portable electronic communication devices for inclusion on the given model of the one or more portable electronic communication devices. Separately or additionally, the application description may be provided to a user of the given model of the one or more portable electronic communication devices.

Moreover, in some embodiments, an initial schema is provided prior to receiving the schema, which includes changes to the initial schema.

Another embodiment provides a method including at least some of the above-described operations.

Another embodiment provides a computer-program product for use in conjunction with the computer system.

BRIEF DESCRIPTION OF THE FIGURES

Note that like reference numerals refer to corresponding parts throughout the drawings.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Embodiments of a computer system, a method, and a computer-program product (e.g., software) for use with the computer system are described. These embodiments may be used to generate an application description of one or more data-described applications that provides one or more functions in a virtual environment on a portable electronic communication device, such as a cellular telephone. This application description may be based at least in part on a schema that defines one or more fields, one or more formats and/or one or more sequences of data. Using the application description, a given data-described application may execute in the virtual environment.

By binding an application description to an execution environment, the application can support multiple models and configurations of the portable electronic communication device. In addition, the application description facilitates rapid development of applications for use on portable electronic communication devices, and the development of applications by non-programmers for use on portable electronic communication devices. In the process, this technique reduces the complexity and expense associated with such software development, thereby removing obstacles to product innovation for portable electronic communication devices.

We now describe embodiments of a process for generating an application description for a set of data-described applications. As noted previously, it is often difficult and expensive to develop and maintain multiple versions of an application that are compatible with (i.e., that support) the numerous models of portable electronic communication devices that are available, including: a wide variety of operating systems, different amounts of memory, different peripheral devices, and/or different communication protocols.

In the discussion that follows, an application description (i.e., schema) that can effectively support multiple data-described applications (i.e., applications in which behavior is data driven) for portable electronic communication devices (which are sometimes referred to as mobile applications) is described. Using this application description (which may be installed on portable electronic communication devices prior to their use by customers and/or downloaded by a user), data associated with a given data-described application is communicated between a portable electronic communication device and a server via a network (such as a cellular-telephone network). Moreover, the data associated with the given data-described application is interpreted by the portable virtual execution environment running on an electronic communication device to provide one or more functions associated with the schema for a set of data-described application.

Note that the application description may correspond to a common schema for the one or more data-described applications. In particular, the schema may be provided by a software developer of the one or more data-described applications. This schema may define data types, data formats, data fields, and/or data sequences for the one or more data-described applications. Moreover, by compiling or interpreting the schema, the application description for a particular model or configuration of the portable electronic communication device may be generated. In this way, the common schema may be ported to multiple models or configurations of the portable electronic communication device, thereby allowing this schema to be leveraged to deliver a variety of mobile applications across a range of environments.

While a wide variety of portable electronic communication devices may use the application description to implement one or more data-described applications, in the discussion that follows, a cellular telephone is often used as an illustration.

Figure 1:
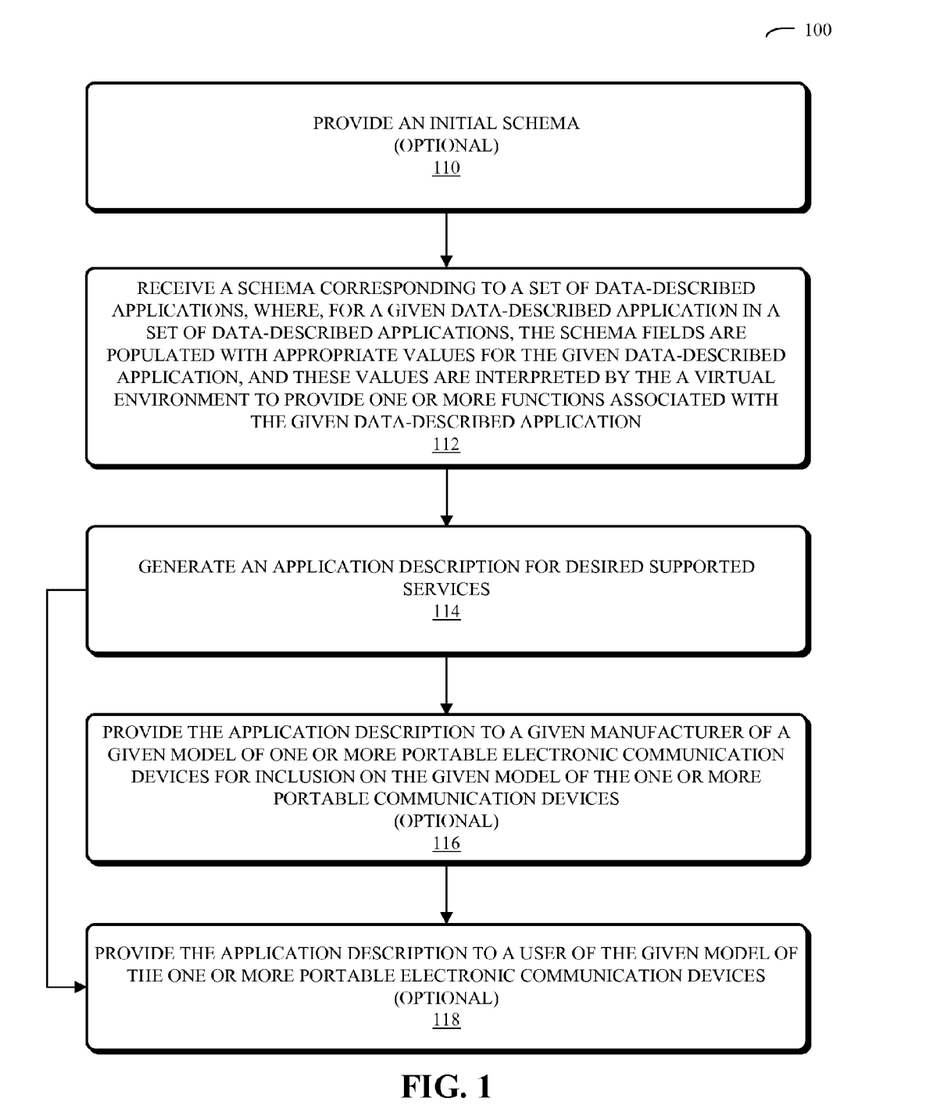
FIG. 1 is a flow chart illustrating a process for generating an application description for a set of data-described applications that is configured to execute in a virtual environment in one or more operating systems on one or more portable electronic communication devices in accordance with an embodiment of the present invention.

FIG. 1 presents a flow chart illustrating a process 100 for generating an application description for a set of data-described applications that is configured to execute in a virtual environment in one or more operating systems on one or more portable electronic communication devices. During operation, the computer system receives a schema corresponding to the set of data-described applications (112), such as financial applications. Note that for a given data-described application in the set of data-described applications, the schema fields are populated with the appropriate values for that specific application. These values are interpreted by the virtual environment to provide one or more functions associated with the given data-described application. For example, the data may include: pictures, text, sounds and/or fields to be filled in by a user. Then, the computer system generates the application description for the desired supported devices (114).

In some embodiments, the one or more portable electronic communication devices include: a cellular telephone, a portable computer, and/or a personal digital assistant.

Moreover, the schema may be specified using a data language. The set of data-described applications for a specific schema is limited by the scope of the schema. Thus, a given schema supports a subset of data-described applications, thereby reducing the complexity, time and expense needed to develop the application description.

Note that a given operating system in the one or more operating systems may correspond to a given model of the one or more portable electronic communication devices, which may include multiple models of the one or more portable electronic communication devices that are provided by multiple manufacturers. For example, the one or more operating systems may include: multiple operating systems and/or different hardware configurations of the multiple models of the one or more portable electronic communication devices. These different hardware configurations may include: different processors, different amounts of memory, and/or different peripherals provided by multiple peripheral manufacturers. Moreover, the virtual environment may be compiled to execute in the given operating system on the given model of the one or more portable electronic communication devices.

In some embodiments, application description is given to a given manufacturer of the given model of the one or more portable electronic communication devices for inclusion to the given model of the one or more portable electronic communication devices (116). Separately or additionally, the application description may optionally be given to a user of the given model of the one or more portable electronic communication devices (118).

Moreover, in some embodiments, the computer system optionally provides an initial schema prior to receiving the schema (110), which then includes changes to the initial schema. For example, the initial schema may include a general template that is modified by a software developer of a set of data-described applications.

In some embodiments of process 100, there may be additional or fewer operations. Moreover, the order of the operations may be changed, and/or two or more operations may be combined into a single operation.

In an exemplary embodiment, the technique for generating an application description allows a one-time investment in porting costs, which is then leveraged to deliver multiple related applications. This technique may include three entities: a data-driven execution environment for a family of related applications (DDE); for each DDE there is an associated data scheme S(DDE); and an application (A) for DDE, which is a populated S(DDE). For each DDE there may be a tradeoff between the complexity and the breadth of supported applications. In order to support a wide varity of application on a mobile device, more than one DDE may be used. Note that a specific DDE may be referred to as $DDE_i$.

A given DDE, such as $DDE_i$, may be ported to all the mobile devices that need to execute the applications in that application family. If there are mobile devices $M_1$ through $M_n$, then $DDE_i:M_i$ is the version of $DDE_i$ that runs on $M_i$. Typically, an application, such as A, may be created for a specific DDE, such as $DDE_i$. Thus, $A_k:DDE_i$ is an application designed for the $DDE_i$ data-driven execution engine. The multiple applications that run on a specific data-driven execution engine (say $DDE_i$) may be referred to as $A_1:DDE_i$ through $A_n:DDE_i$.

Because each $A_k$ may be created for $DDE_i$, it may be bound to a given subset of $DDE_i:M_1$ through $DDE_i:M_n$ (i.e., a given subset of the current ports of the $DDE_i$ data-driven execution environment). $A_k:DDE_i:M_j$ refers to $k^{th}$ application written for the $i^{th}$ data-driven execution environment running on the $j^{th}$ mobile device. Multiple technologies can be used to bind applications (e.g., $A_k$) to their data-driven execution environment for the multiple handsets (e.g., $DDE_i$:$M_1$ through $DDE_i$:$M_n$) including interpretation and compilation. Using interpretation, $DDE_i$ may read $A_k$ schema $S(DDE_i)$ at runtime. Alternatively, using compilation, the compiler may use the information in $A_k$ and scheme $S(DDE_i)$ to generate code that gets embedded in each $DDE_i$:$M_1$ through $DDE_i$:$M_n$.

Note that bi-directional server communication can be a feature of a DDE. For example, a data-driven execution environment that supports server communication (e.g., $DDE_i$) that is executing a specific application (e.g., $A_k$) may communicate with the server specified by that application.

There are also multiple ways to create a specific application (e.g., $A_k$:$DDE_i$). In some embodiments, application creation is aided by a generic tool that reads $S(DDE_i)$ and guides the user to provide the information that enables the application or a specific tool designed for a specific data-driven execution environment, such as $DDE_i$.

Furthermore, many mobile applications involve information retrieval. In some embodiments, information retrieval for $DDE_1$ involves the following process flow, where the initial s and r variable values may be based on the schema populated for this application. In a first operation s1 is tested. If it is 'on' proceed to operation three. Otherwise, in a second operation, read from server based on the information contained in r1. Moreover, retrieve values for f1 through f5 from the server, and set the following based on r1 and the information retrieved from the server: for v1 through v5, $v_i$ is set to 'true' if $f_i$ and $t_i$ were updated (where for t1 through t5, $t_i$ is the type code for $v_i$), otherwise set to 'false.'

In operation three, test s2. If it is 'on' go to operation five. Otherwise, in operation four, display a screen based on information in r2 and f1 through f5 (if valid and referred to in r2).

Next, in operation five, test s3. If it is 'on' go to operation seven. Otherwise, in operation six, retrieve the user input from the fields displayed in operation four.

In operation seven, test s4. If it is 'on' go to operation nine. Otherwise, in operation eight, based on user input and the information in r3 query the server and retrieve values for f1 through f5 from the server, and set the following based on r3 and the information retrieved from the server: for v1 through v5, $v_i$ is set to 'true' if $f_i$ and $t_i$ were updated (where for t1 through t5, $t_i$ is the type code for $v_i$), otherwise set to 'false.'

Furthermore in operation nine, test s5. If it is 'on' go to operation eleven. Otherwise, in operation ten, display a screen based on information in r4 and f1 through f5 (if valid and referred to in r3).

In operation eleven, test s6. If it is 'on' go to operation thirteen. Otherwise, in operation twelve, wait for the use to ask for next. Additionally, in operation thirteen, go to the operation specified in r5.

An application can be built using this as the process flow of $DDE_i$. For example, application 1 may display the current weather in Pittsburg. In this example, s1=true, s2=false, s3=true, s4=false, s5=false, and s6=true. Moreover, r5 contains the information to loop back to operation seven. Therefore, operations one, three, four, five, seven, eight, nine, ten, eleven and back to operation seven are included in the process flow. After removing the tests, the actual process flow is operations four, eight, ten and back to operation eight. Note that in operation four, based on r2 and f1 through f5 (as needed), a welcome screen may be displayed. Furthermore, in operation eight, r3 may include the information to query the server for the current temperature in Pittsburg. Additionally, in operation ten, r4 and f1 through f5 (as needed) may be used to display the current temperature.

If application 1 supported the user specifying the city, more of the operations may be used in the process flow. Furthermore, this process flow may be used in a wide variety of information retrieval applications such as: generalized weather (enter city or zip code), stock quotes (enter a stock symbol), locate the nearest restaurant of a selected type, provide a current bank balance, etc. Thus, by binding the application to its data-driven execution environment (which supports multiple applications and thus amortizes the porting costs), the application may inherently support all of the models and configurations of the portable electronic communication devices that are supported by its data-driven execution environment.

Note that in some embodiments of this process flow, there may be additional or fewer operations. Moreover, the order of the operations may be changed, and/or two or more operations may be combined into a single operation.

In an exemplary embodiment, the application description is a general-purpose, virtual environment (e.g., a virtual machine) that operates in the environment of the operating system in a cellular telephone. Moreover, by leveraging a common schema to reduce complexity, the application description may facilitate the development of software applications for cellular telephones. This approach may accommodate the lack of standards in these devices (including the different operating systems, the different communication protocols, and/or the different hardware configurations). In some embodiments, the architecture of the application description is analogous to a web browser, but is specifically designed for different applications and functionality (such as financial applications and/or games) in the environment of a cellular telephone.

Note that a given schema may be designed to support a subset of the data-described applications that is no broader than the data defined by the schema, thereby reducing the cost and the complexity of the application description. For example, the subset may include all of the data-described applications that can be expressed by the scope of the schema. Furthermore, this schema may support some or all of the current models and configurations of cellular telephones. In particular, a compiled or interpreted application description can be generated from an appropriately populated schema and an execution environment for each of the supported models and configurations.

A wide variety of data-described applications may be implemented using a common schema and the application descriptions. For example, the data-described applications may include those that communicate information, such as: pictures, text, sounds, and/or fields to be filled in based at least in part on user selection or user-entered data. In some embodiments, animation (e.g., of sounds and displayed items) and/or validation (of user-entered data) is supported. Furthermore, as described below with reference to FIG. 2, data associated with the data-described applications may be stored on the cellular telephone and/or communicated to the cellular telephone from a server. This data may describe the initial information to be communicated, such as animation and validation information.

In some embodiments, the data-described applications include applications that: accept inputs and display static data (such as an address, phone number, price of an offering, etc.); accept inputs and display dynamic data (such as directions from a current location to a destination, the address of the closest gas station, whether a desired product is in stock, etc.); and/or perform transactions (e.g., accepting payment via a credit card, making an appointment, etc.). Note that these data-described applications are described using a data language (e.g. an extensible markup language or XML), as opposed to a procedural language (such as Java).

Figure 2:
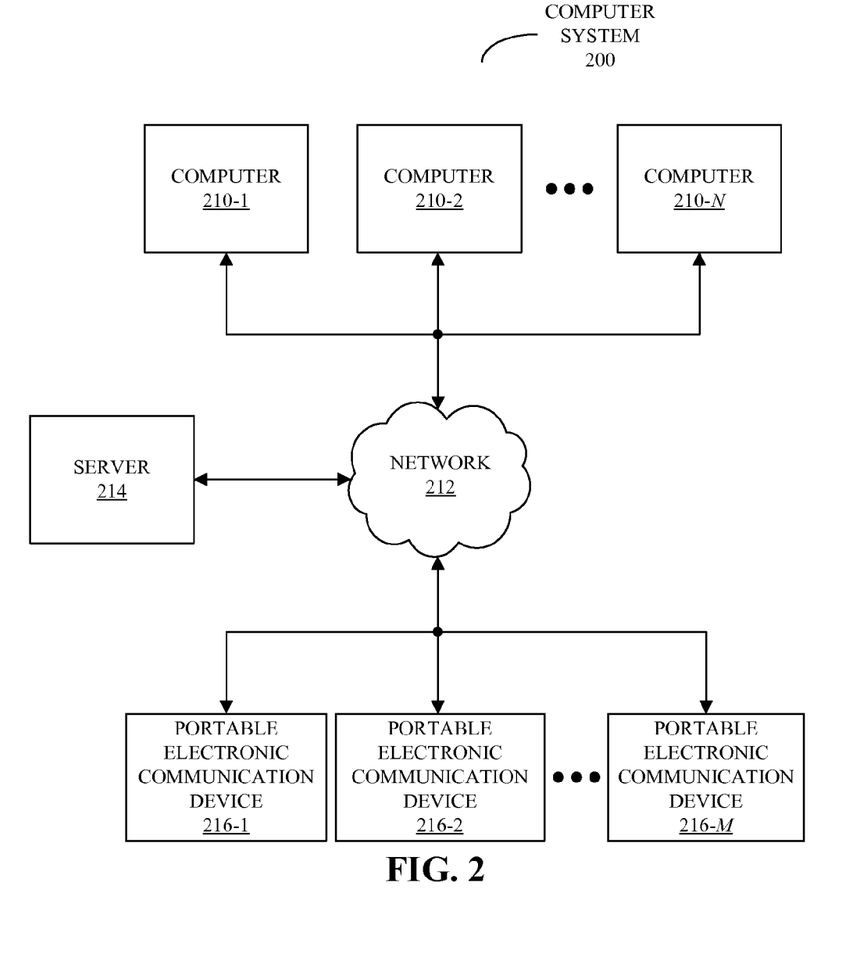
FIG. 2 is a block diagram illustrating a networked computer system that communicates one or more schemas corresponding to the set of data-described applications and data associated with one or more application descriptions in accordance with an embodiment of the present invention.

We now describe embodiments of a computer system that performs process 100. FIG. 2 presents a block diagram illustrating a networked computer system 200 that communicates one or more schemas corresponding to the set of data-described applications and data associated with one or more application descriptions. In this computer system, an operator of server 214 may provide a software product via network 212 to computers 210 used by one or more software developers. This software product may allow the one or more software developers to define one or more schemas that describe their software applications in terms of the associated data. As noted previously, in some embodiments the software product includes one or more initial schemas that the one or more software developers can use as an initial template to create the one or more schemas.

In some embodiments, the software product is installed and executes on computers 210. Alternatively, the one or more software developers may utilize a software-application tool that is embedded in a web page which is rendered by web browsers on computers 210. This web page may be provided by server 214 via network 212. Note that the software-application tool may be a stand-alone application or a portion of another application (such as software that is resident on computers 210 and/or that executes on server 214). In an illustrative embodiment, the software-application tool is a software package written in: JavaScript™ (a trademark of Sun Microsystems, Inc.), e.g., the software-application tool includes programs or procedures containing JavaScript instructions, ECMAScript (the specification for which is published by the European Computer Manufacturers Association International), VBScript™ (a trademark of Microsoft, Inc.), or any other client-side scripting language. In other words, the embedded software-application tool may include programs or procedures containing. JavaScript, ECMAScript instructions, VBScript instructions, or instructions in another programming language suitable for rendering by the web browsers or another client application on computers 210.

Subsequently, the one or more software developers provide the one or more schemas to server 214 via network 212. A given schema, which may support one or more data-described applications, may be compiled with the appropriate data on server 214 to generate an associated application description for use on one or more models and/or configurations of portable electronic communication devices 216. Alternatively, in some embodiments, the software product compiles the schemas and provides the application descriptions to server 214 via network 212.

One or more of these application descriptions may be installed on one or more of portable electronic communication devices 216 prior to their use by customers or users. For example, an operator of server 214 (e.g., a provider of the software product) may negotiate with cellular-telephone manufacturers or cellular-network operators to allow installation of the application descriptions on one or more of portable electronic communication devices 216 prior to their use by users. Alternatively or additionally, a user of a given portable electronic communication device may download a given application description from server 214 via network 212.

When one of the supported data-described applications is used on a given portable electronic communication device (such as portable electronic communication device 216-1), a corresponding application description may provide a high-level virtual environment that executes in the environment/operating system of portable electronic communication device 216-1, and which interprets data according to an associated schema to provide one or more functions in the data-described application.

For example, a user may provide data to portable electronic communication device 216-1. This data may be displayed by the data-described application in a field as instructed by the application description (based at least in part on the associated schema). Moreover, in response to the user input, the data-described application may request additional data from server 214. This request may be processed by server 214, and the requested data may be provided by server 214 to portable electronic communication device 216-1 via network 212. Then, the application description may interpret this additional data according to the associated schema, which allows the data-described application to provide one or more additional functions. These operations may be repeated as long as the user continues to use the data-described application.

In some embodiments, data associated with the data-described applications is stored on portable electronic communication devices 216, server 214, and/or at another remote location in computer system 200. Because this information may be sensitive in nature (such as financial information associated with financial software), it may be encrypted. For example, stored information and/or information communicated via network 212 may be encrypted.

Computers and servers in computer system 200 may include one of a variety of devices capable of manipulating computer-readable data or communicating such data between two or more computing systems over a network, including: a personal computer, a laptop computer, a mainframe computer, a portable electronic device (such as a cellular phone or PDA), a server and/or a client computer (in a client-server architecture). Moreover, network 212 may include: the Internet, World Wide Web (WWW), an intranet, LAN, WAN, MAN, or a combination of networks, or other technology enabling communication between computing systems.

In exemplary embodiments, the financial software includes the mobile versions of software such as: Quicken™ and/or TurboTax™ (from Intuit, Inc., of Mountain View, Calif.), Microsoft Money™ (from Microsoft Corporation, of Redmond, Wash.), SplashMoney™ (from SplashData, Inc., of Los Gatos, Calif.), Mvelopes™ (from In2M, Inc., of Draper, Utah), and/or open-source applications such as Gnucash™, PLCash™, Budget™ (from Snowmint Creative Solutions, LLC, of St. Paul, Minn.), and/or other planning software capable of processing financial information.

Moreover, the financial software may include the mobile versions of software such as: QuickBooks™ (from Intuit, Inc., of Mountain View, Calif.), Peachtree™ (from The Sage Group PLC, of Newcastle Upon Tyne, the United Kingdom), Peachtree Complete™ (from The Sage Group PLC, of Newcastle Upon Tyne, the United Kingdom), MYOB Business Essentials™ (from MYOB US, Inc., of Rockaway, N.J.), NetSuite Small Business Accounting™ (from NetSuite, Inc., of San Mateo, Calif.), Cougar Mountain™ (from Cougar Mountain Software, of Boise, Id.), Microsoft Office Accounting™ (from Microsoft Corporation, of Redmond, Wash.), Simply Accounting™ (from The Sage Group PLC, of Newcastle Upon Tyne, the United Kingdom), CYMA IV Accounting™ (from CYMA Systems, Inc., of Tempe, Ariz.), DacEasy™ (from Sage Software SB, Inc., of Lawrenceville, Ga.), Microsoft Money™ (from Microsoft Corporation, of Redmond, Wash.), and/or other payroll or accounting software capable of processing payroll information.

Figure 3:
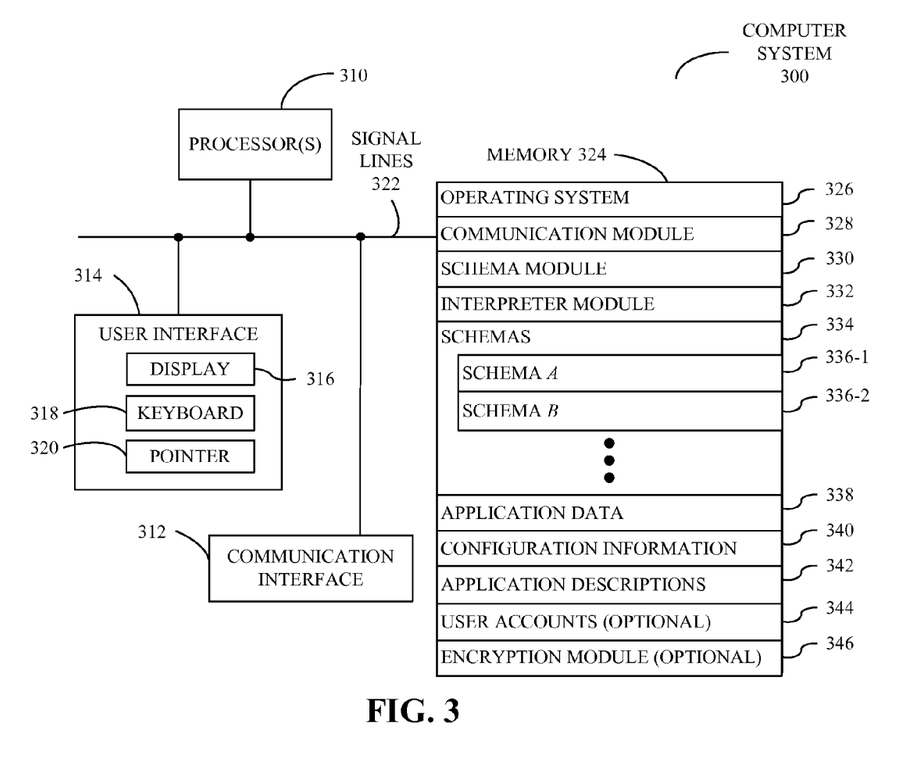
FIG. 3 is a block diagram illustrating a computer system that generates the application description for the set of data-described applications in accordance with an embodiment of the present invention.

FIG. 3 is a block diagram illustrating a computer system 300 that generates the application description for the set of data-described applications. Computer system 300 includes one or more processors 310, a communication interface 312, a user interface 314, and one or more signal lines 322 coupling these components together. Note that the one or more processing units 310 may support parallel processing and/or multi-threaded operation, the communication interface 312 may have a persistent communication connection, and the one or more signal lines 322 may constitute a communication bus. Moreover, the user interface 314 may include: a display 316, a keyboard 318, and/or a pointer 320, such as a mouse.

Memory 324 in the computer system 300 may include volatile memory and/or non-volatile memory. More specifically, memory 324 may include: ROM, RAM, EPROM, EEPROM, flash memory, one or more smart cards, one or more magnetic disc storage devices, and/or one or more optical storage devices. Memory 324 may store an operating system 326 that includes procedures (or a set of instructions) for handling various basic system services for performing hardware-dependent tasks. Memory 324 may also store procedures (or a set of instructions) in a communication module 328. These communication procedures may be used for communicating with one or more computers and/or servers, including computers and/or servers that are remotely located with respect to the computer system 300.

Memory 324 may also include multiple program modules (or sets of instructions), including: schema module 330 (or a set of instructions), interpreter module 332 (or a set of instructions), and/or optional encryption module 346 (or a set of instructions). Using schema module 330, one or more software developers may define schemas 334, such as schema A 336-1 and schema B 336-2. Note that a given schema may define data associated with one or more data-described applications.

Subsequently, interpreter module 332 may compile a given schema based at least in part on configuration information 340 for one or more cellular telephones to generate one or more application descriptions 342. These application descriptions may be installed on the one or more cellular telephones prior to their use by customers or users. Alternatively or additionally, a user of a given cellular telephone may download one or more of the application descriptions 342 via a cellular-telephone network. In some embodiments, the user purchases the one or more of the application descriptions 342, and billing information associated with this transaction is stored in optional information for user accounts 344.

When a user is using a given data-described application, computer system 300 may receive and provide data, such as application data 338, to the user's cellular telephone. This application data may be interpreted by one of the application descriptions 342 installed on the user's cellular telephone to facilitate one or more functions associated with the given data-described application. Thus, the given data-described application may be implemented in the environment of the user's cellular telephone by the application data 338 provided by computer system 300 and at least one of the application descriptions 342.

In some embodiments, at least some of the information stored in memory 324 and/or at least some of the information communicated using communication module 328 is encrypted using optional encryption module 346.

Instructions in the various modules in the memory 324 may be implemented in: a high-level procedural language, an object-oriented programming language, and/or in an assembly or machine language. Note that the programming language may be compiled or interpreted, e.g., configurable or configured, to be executed by the one or more processing units 310.

Although the computer system 300 is illustrated as having a number of discrete items, FIG. 3 is intended to be a functional description of the various features that may be present in the computer system 300 rather than a structural schematic of the embodiments described herein. In practice, and as recognized by those of ordinary skill in the art, the functions of the computer system 300 may be distributed over a large number of servers or computers, with various groups of the servers or computers performing particular subsets of the functions. In some embodiments, some or all of the functionality of the computer system 300 may be implemented in one or more application-specific integrated circuits (ASICs) and/or one or more digital signal processors (DSPs).

Computer systems 200 (FIG. 2) and/or 300 may include fewer components or additional components. Moreover, two or more components may be combined into a single component, and/or a position of one or more components may be changed. In some embodiments, the functionality of the computer system 300 may be implemented more in hardware and less in software, or less in hardware and more in software, as is known in the art.

Figure 4:
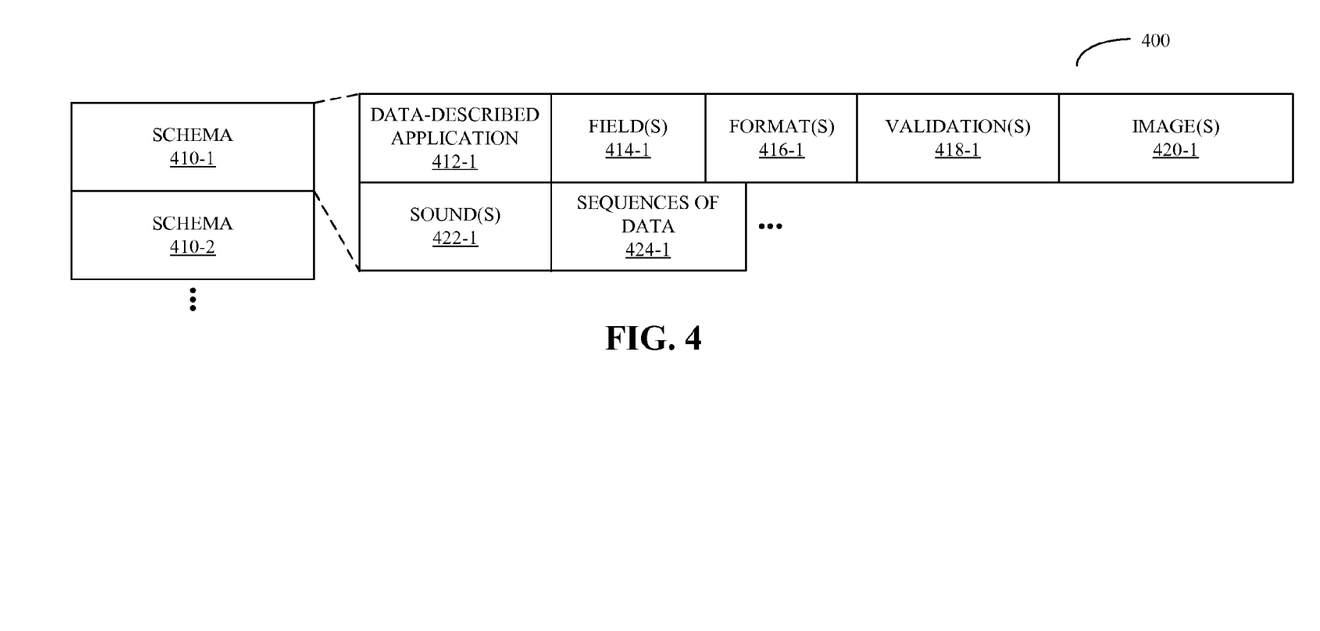
FIG. 4 is a block diagram illustrating a data structure in accordance with an embodiment of the present invention.

We now discuss data structures that may be used in computer system 200 (FIG. 2) and/or 300. FIG. 4 presents a block diagram illustrating a data structure 400. This data structure may include schemas 410 associated with one or more data-described applications that are provided by one or more software developers. For example, schema 410-1 may include: a data-described application 412-1 that is associated with schema 410-1, one or more fields 414-1, one or more formats 416-1, one or more data validations 418-1, one or more images 420-1, one or more sounds 422-1, and/or one or more sequences of data 424-1.

Note that in some embodiments of data structure 400 there may be fewer or additional components. Moreover, two or more components may be combined into a single component, and/or a position of one or more components may be changed.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for generating an application description for a set of data-described applications that is configured to execute in a virtual environment in one or more operating systems on one or more portable electronic communication devices, comprising:

receiving a schema corresponding to the set of data-described applications, wherein, for a given data-described application in the set of data-described applications, the schema defines a process flow by providing values for one or more fields, one or more formats and one or more sequences of data, wherein the schema is specified in a non-procedural language, and wherein the provided values are interpreted by the virtual environment to provide one or more functions associated with the given data-described application; and generating the application description corresponding to the schema by populating the one or more fields defined in the schema with appropriate values, wherein the appropriate values define a process flow in the generated application when executing within the virtual environment in a given operating system in a corresponding portable electronic communication device.

2. The method of claim 1, wherein the one or more portable electronic communication devices include a cellular telephone.

3. The method of claim 1, wherein the one or more portable electronic communication devices include a portable computer.

4. The method of claim 1, wherein the one or more portable electronic communication devices include a personal digital assistant.

5. The method of claim 1, wherein the set of data-described applications is restricted to applications associated with data defined by the schema.

6. The method of claim 1, wherein the set of data-described applications includes financial applications.

7. The method of claim 1, wherein the schema is specified using a data language.

8. The method of claim 1, wherein a given operating system in the one or more operating systems corresponds to a given model of the one or more portable electronic communication devices, which include multiple models of the one or more portable electronic communication devices that are provided by multiple manufacturers.

9. The method of claim 8, wherein the one or more operating systems include multiple operating systems.

10. The method of claim 8, wherein the one or more operating systems include different hardware configurations of the multiple models of the one or more portable electronic communication devices.

11. The method of claim 10, wherein the different hardware configurations include different processors.

12. The method of claim 10, wherein the different hardware configurations include different amounts of memory.

13. The method of claim 10, wherein the different hardware configurations include different peripherals provided by multiple peripheral manufacturers.

14. The method of claim 8, wherein the virtual environment is compiled to execute in the given operating system on the given model of the one or more portable electronic communication devices.

15. The method of claim 8, further comprising providing the application description to a given manufacturer of the given model of the one or more portable electronic communication devices for inclusion on the given model of the one or more portable electronic communication devices.

16. The method of claim 8, further comprising providing the application description to a user of the given model of the one or more portable electronic communication devices.

17. The method of claim 1, further comprising providing an initial schema prior to receiving the schema, wherein the schema includes changes to the initial schema.

18. A computer-program product for use in conjunction with a computer system, the computer-program product comprising a computer-readable storage medium and a computer-program mechanism embedded therein for generating an application description for a set of data-described applications that is configured to execute in a virtual environment in one or more operating systems on one or more portable electronic communication devices, the computer-program mechanism including:

instructions for receiving a schema corresponding to the set of data-described applications, wherein, for a given data-described application in the set of data-described applications, the schema defines a process flow by providing values for one or more fields, one or more formats and one or more sequences of data, wherein the schema is specified in a non-procedural language, and wherein the provided values are interpreted by the virtual environment to provide one or more functions associated with the given data-described application; and instructions for generating the application description corresponding to the schema by populating the one or more fields defined in the schema with appropriate values, wherein the appropriate values define a process flow in the generated application when executing within the virtual environment in a given operating system in a corresponding portable electronic communication device.

19. The computer-program product of claim 18, wherein the one or more portable electronic communication devices include a cellular telephone.

20. The computer-program product of claim 18, wherein a given operating system in the one or more operating systems corresponds to a given model of the one or more portable electronic communication devices, which include multiple models of the one or more portable electronic communication devices that are provided by multiple manufacturers.

21. The computer-program product of claim 18, wherein the one or more operating systems include multiple operating systems.

22. The computer-program product of claim 18, wherein the one or more operating systems include different hardware configurations of the multiple models of the one or more portable electronic communication devices.

23. A computer system, comprising:

a processor;

memory;

a program module, wherein the program module is stored in the memory and configured to be executed by the processor, wherein the program module is for generating an application description for a set of data-described applications that is configured to execute in a virtual environment in one or more operating systems on one or more portable electronic communication devices, the program module including:

instructions for receiving a schema corresponding to the set of data-described applications, wherein, for a given data-described application in the set of data-described applications, the schema defines a process flow by providing values for one or more fields, one or more formats and one or more sequences of data, wherein the schema is specified in a non-procedural language, and wherein the provided values are interpreted by the virtual environment to provide one or more functions associated with the given data-described application; and instructions for generating the application description corresponding to the schema by populating the one or more fields defined in the schema with appropriate values, wherein the appropriate values define a process flow in the generated application when executing within the virtual environment in a given operating system in a corresponding portable electronic communication device.

* * * * *